United States Patent Office 3,430,419
Patented Mar. 4, 1969

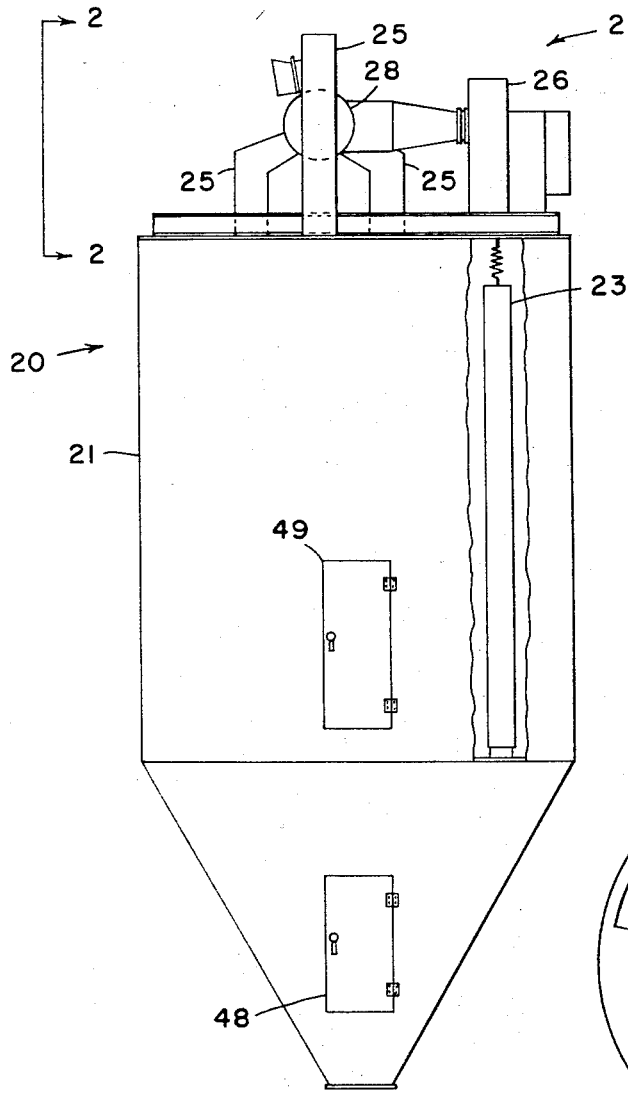
Fig. 1
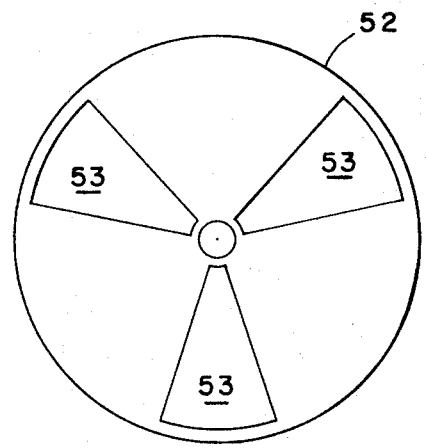
Fig. 11
Fig. 12

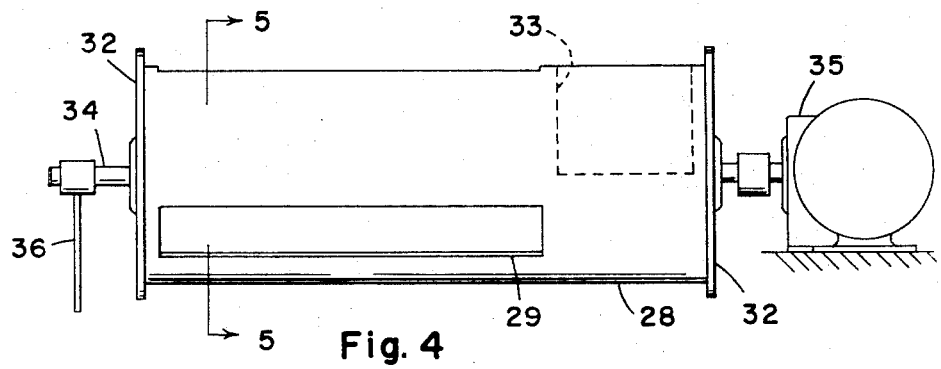
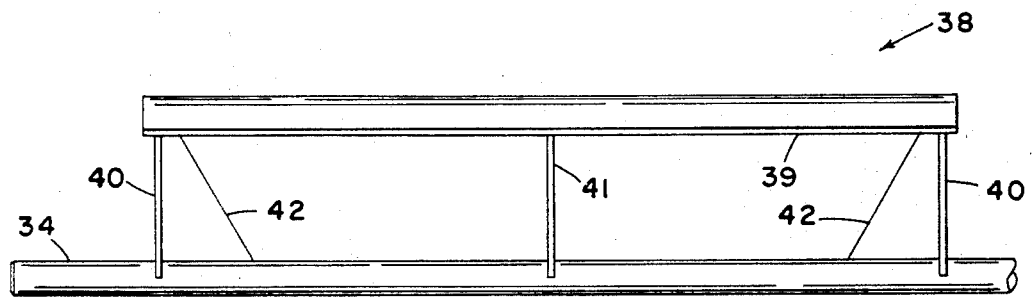
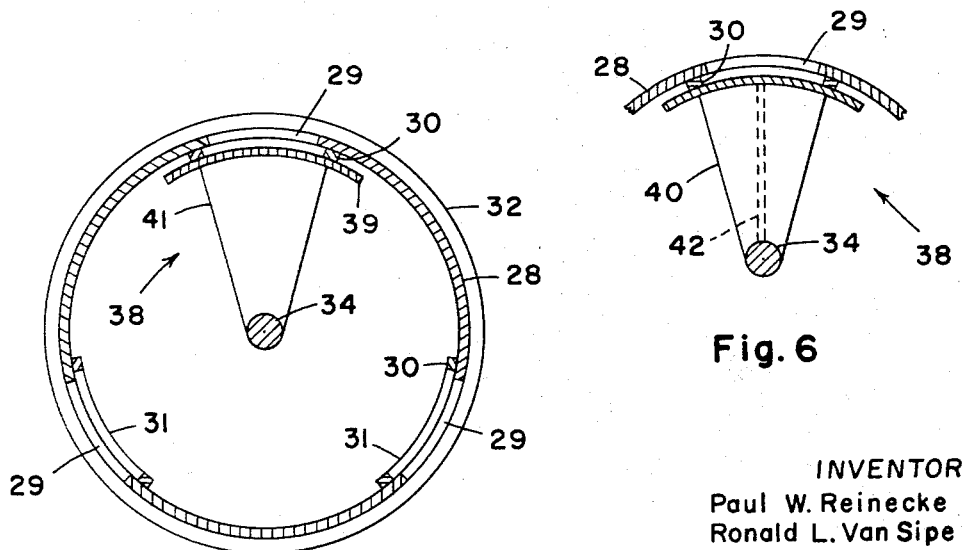

3,430,419
APPARATUS FOR REVERSE AIR CLEANING
OF DUST COLLECTORS
Paul W. Reinecke, Ronald L. Van Sipe, Walter W. Dowd,
Donald O. Liske, and Daniel J. Betoski, Alpena, Mich.,
assignors to National Gypsum Company, Buffalo, N.Y.,
a corporation of Delaware
Filed May 3, 1967, Ser. No. 635,762
U.S. Cl. 55—302                                4 Claims
Int. Cl. B01d 29/24

ABSTRACT OF THE DISCLOSURE

An apparatus for reverse air cleaning of bag type dust collectors which have a plurality of separate compartments. A cylindrical discharge chamber is connected to each of the discharge ducts from the compartments of the dust collector, with a single rotary damper being mounted within the chamber to regulate the flow of filtered gases from each compartment. A reverse air duct communicates with each compartment of the dust collector with a reverse air damper mounted in each reverse air duct to control the flow of reverse cleaning air into the compartments. The reverse air dampers are cam operated, being responsive to a cam attached to the shaft on which the rotary damper is mounted. A pulsatory air current generator communicates with the reverse air ducts to provide a pulsatory current of air for cleaning of the filter bags.

---

This invention relates to bag type dust collectors. More particularly, it relates to an improved apparatus for reverse air cleaning of bag type dust collectors.

Bag type dust collectors are widely used in air pollution control. Such dust collectors generally consist of a plurality of cloth filter bags suspended from the top of a housing and secured at the bottom around thimbles which protrude from the floor of the housing. Dust-laden gases enter the housing from a lower plenum and pass upwardly through the bags, with the dus tparticles being retained on a mat of dust which is supported on the inner surfaces of the filter bags. The dust-free gases are then discharged from the unit. The bag housing is usually divided into several compartments each containing a plurality of the filter bags, to permit one compartment to be isolated from the system and cleaned while the other compartments remain in operation. Cleaning of the filter bags may be achieved by several different techniques. According to one method commonly used, the bags are cleaned by shutting down one compartment of the housing and passing air therethrough counter-current to the normal direction of flow of the gas to be filtered. Preferably a pulsating flow of the reverse cleaning air is used, for it has been found that a pulsating stream of air is more effective than a continuous air stream in removing dust from the bags. While such reverse air cleaning is generally effective in removing dust from the filter bags, this cleaning technique suffers from a number of disadvantages which tend to limit its use. For example, reverse air cleaning dust collectors require considerable mechanical equipment. Thus, a separate discharge damper is usually required for each compartment of the bag housing to permit each compartment to be isolated from the system. In order to clean the bags with a reverse air flow, a reverse air conduit must be provided for each compartment together with a reverse air damper in each of these conduit to control the flow of reverse cleaning air to the compartments. Thus for a dust collector having three compartments, six separate dampers are generally required, that is, three discharge dampers and three reverse air dampers. Also, each of the dampers in the system is usually controlled by a separate motor, so that six motors are used in the system. In addition, a timer is required to synchronize the operation of each of the motors and dampers.

It is therefore an object of this invention to provide an improved apparatus for reverse air cleaning of bag type dust collectors.

Another object of the invention is to provide an improved damper and damper control system in the discharge ducts and reverse air conduits of a bag type dust collector.

Another object is to provide an apparatus for reverse air cleaning of multi-compartment bag type dust collectors in which only two motors and no timers are required to clean the filter bags with a pulsating stream of reverse air.

Various other objects and advantages will appear from the following description of the invention and the novel features will be particularly pointed out in the appended claims.

According to the present invention, a conventional multi-compartment bag type dust collector is provided with an improved apparatus for reverse air cleaning of the filter bags using a pulsatory stream of reverse air. This improved apparatus comprises the combination of two continuously operating motors; a continuously operating rotary discharge damper driven by one of the motors; a continuously operating pulsatory air current generator driven by the other motor; and a cam-operated reverse air damper in each of the reverse air ducts which communicate with the compartments in the housing, the reverse air dampers being responsive to a cam attached to a shaft on which the rotary discharge damper is mounted. A discharge duct is connected to each compartment of the dust collector for removal of the dust-free gases therefrom, with each of the discharge ducts communicating with a discharge chamber from which the gases are discharged into the atmosphere. The rotary damper continuously rotates within this discharge chamber for regulating the flow of dust-free gases into the chamber. A reverse air duct communicates with each compartment of the dust collector for introducing a current of reverse cleaning air into the compartments, with a reverse air damper being positioned in each reverse air duct for regulating the flow of reverse cleaning air. These reverse air dampers are actuated by a cam attached to the shaft on which the rotary damper is mounted. In this manner, the rotation of the rotary damper in the discharge chamber not only controls the flow of dust-free gases from the compartments of the dust collector, but also regulates the flow of reverse cleaning air into the compartments for cleaning the filter bags. Thus, the rotary damper and the reverse air dampers are so related that as the rotary damper closes off the flow of dust-free air from one compartment of the dust collector, the reverse air damper for that compartment is simultaneously opened, thereby admitting a current of reverse air into the compartment for cleaning of the bags. Each of the reverse air ducts is connected to a pulsatory air current generator so that a pulsatory current of air is available for cleaning of the bags.

The improved dust-free gas removal and reverse air cleaning apparatus of the present invention eliminates the need for a control system which is normally required to open and close the various dampers used in the bag cleaning operation, and reduces the number of dampers and motors required in the system.

In order to more clearly describe the present invention, the following is a description of the preferred embodiment illustrated in the accompanying drawings, wherein:

FIGURE 1 is a front view of a bag type dust collector provided with the improved reverse air cleaning apparatus of the present invention.

FIGURE 4 is a side view of the discharge chamber in which the rotary damper is mounted.

FIGURE 5 is a sectional view of the discharge chamber taken along line 5—5 of FIG. 4.

FIGURE 6 is a sectional view of the rotary damper.

FIGURE 7 is a side view of the rotary damper.

FIGURES 11 and 12 are a front view of the circular plates mounted in the device shown in FIGURE 10.

Figure 2:
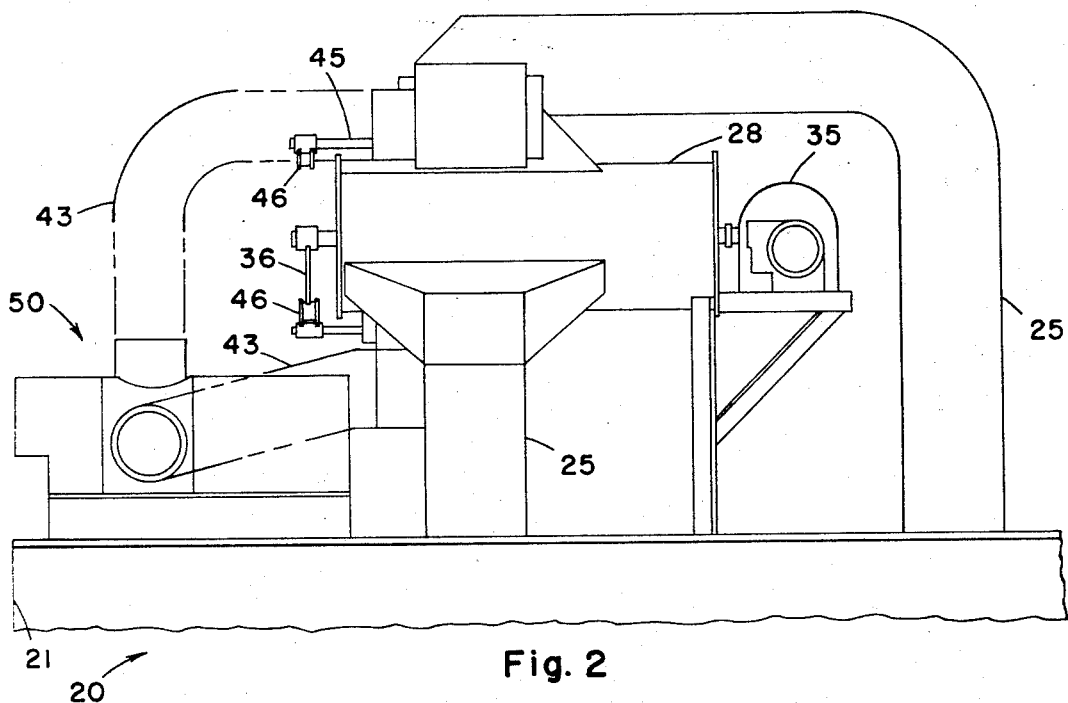
FIGURE 2 is a side view of the reverse air cleaning apparatus of this invention, taken along lines 2—2 of FIG. 1.

Referring now more particularly to the drawings, there is illustrated a bag-type dust collector 20 comprising a conventional bag housing 21 and the reverse air cleaning apparatus 22 of this invention associated with the bag housing. The bag housing is divided into a plurality of separate compartments (A, B and C in FIG. 3) with a plurality of filter bags 23 being suspended in each compartment. Dust-laden gases are introduced into the unit via inlet flue 24 and pass upwardly through the bags, with the dust particles being retained on the inner surfaces of the bags. A discharge duct 25 is connected to each compartment of the bag housing for removal of the dust-free gases therefrom. Each of the discharge ducts communicates with a discharge chamber 28 from which the dust-free gases are discharged into the atmosphere. A fan 26 or other blower means is associated with the discharge chamber to create a negative pressure in the system so that the gases to be filtered are drawn through the system and the dust-free gases discharged therefrom.

According to the present invention, a separate discharge duct 25 is connected to each compartment of the bag housing, so that one compartment may be shut off for cleaning of the bags without interfering with the dust-removal operation in the other compartments, all of the discharge ducts communicating with discharge chamber 28 which is located outside of the bag housing. As shown in FIGURES 4 and 5, discharge chamber 28 is a cylindrical unit closed at both ends by plates 32. A plurality of inlet openings 29 are spaced around the circumference of the discharge chamber, with a discharge duct 25 being connected to the chamber at each of these openings so that the dust-free gases may be introduced into the discharge chamber. Preferably, these inlet openings 29 are spaced equidistant around the circumference of the chamber. The chamber 28 is also provided with a discharge opening 33, which communicates with the fan 26 or other blower means for removing the filtered gases from the chamber. A rotary shaft 34 extends concentrically through the discharge chamber, with the ends of the shaft extending outside the chamber beyond the plates. One end of the shaft is connected to motor 35, with the shaft being continuously rotated at a predetermined speed. A cam 36 is attached to the other end of the shaft, with the cam being rotated by the rotation of the shaft.

Figure 3:
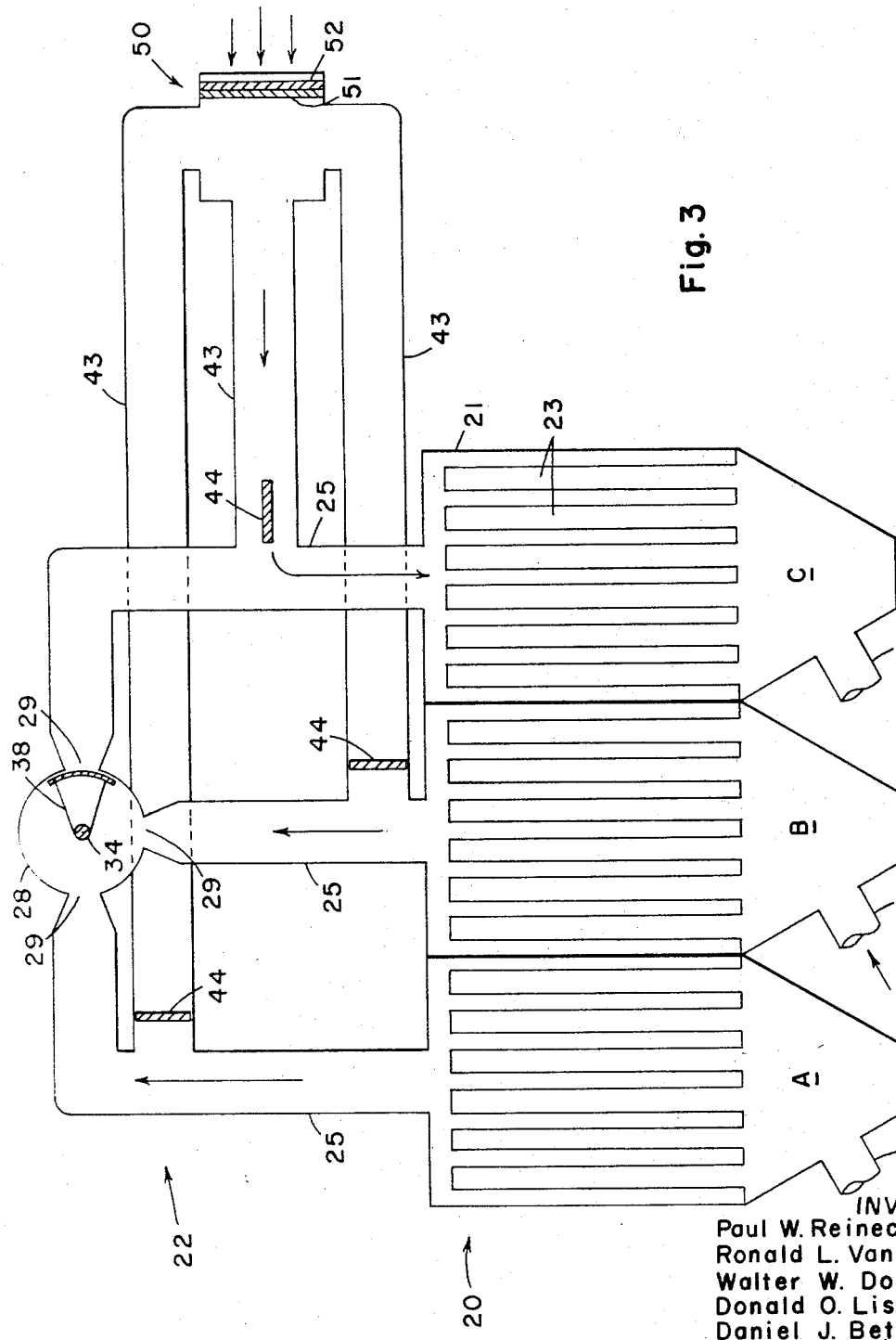
FIGURE 3 is a schematic drawing of a multi-compartment bag type dust collector provided with the improved reverse air cleaning apparatus of this invention.

A rotary damper 38 is mounted on shaft 34 within the discharge chamber. This damper is adapted to continuously rotate within the chamber at a predetermined speed (for example, one revolution every 15 minutes) and is of sufficient size and proper shape to close the inlet opening to which it is presented as it rotates in the chamber. In this manner, the single rotary damper can control the flow of dust-free gases from each of the compartments of the dust collector by periodically interrupting the flow of filtered gases from each compartment into the discharge chamber. When the damper closes one of the inlet openings, as shown in FIGURES 3, 5 and 6, the flow of gases, from that compartment of the housing associated with that opening, is discontinued. Preferably, this rotary damper has an arcuate face plate 39 held in position by end plates 40 and supporting ribs 41 and 42, the end plates and supporting ribs being secured to the rotary shaft 34, as shown in FIGURES 5–7. The inner surface of the discharge chamber preferably is provided with a salient portion 30 surrounding each of the inlet openings 29. These salient portions have a curved surface 31 which has the same or substantially the same degree of curvature as the arcuate face plate 39 on the rotary damper, so that the rotary damper engages the surface of the salient portions as it rotates around the discharge chamber and seals off the corresponding compartment in the dust collector. If desired, these salient portions may be omitted, with the damper engaging the inner surface of the discharge chamber to close the openings.

Figure 9:
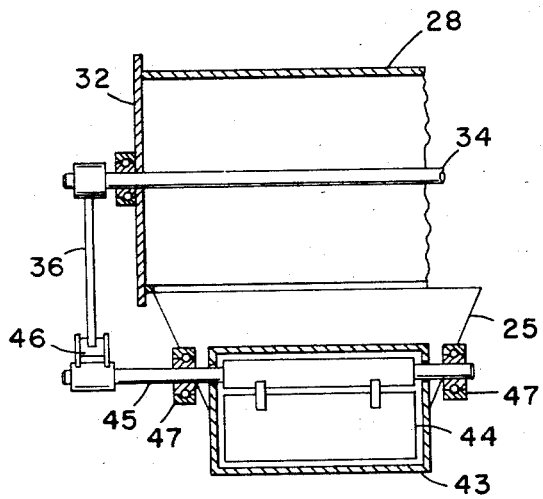
FIGURE 9 is a sectional view of a portion of the discharge chamber and the reverse air damper.
Figure 8:
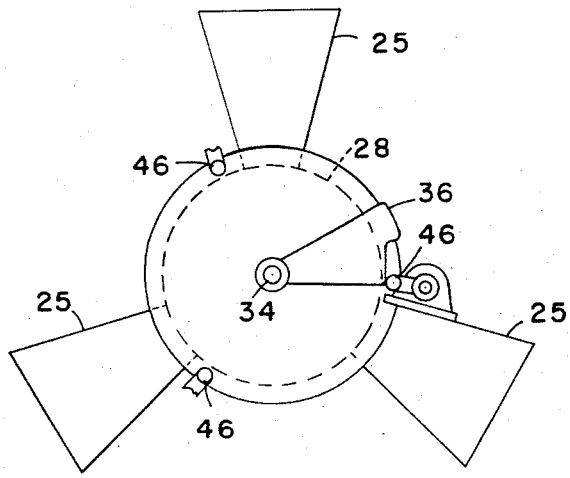
FIGURE 8 is an end view of the discharge chamber.

A reverse air duct 43 communicates with each compartment of the housing, to supply air for reverse air cleaning of the filter bags. A reverse air damper 44 is positioned in each reverse air duct to regulate the flow of reverse cleaning air into the compartments of the dust collector. The reverse air damper is of sufficient size and of proper shape to close the reverse air duct when it is in a closed position, and permits reverse cleaning air to flow freely into the compartments of the bag housing when it is in an open position. The damper 44, which is normally biased closed, is mounted on a shaft 45, which is supported by bearings 47. A cam follower 46 is attached to one end of the shaft, with the cam follower associated with each reverse air damper being in the same plane as the cam 36. Thus, as shown in FIGURES 8 and 9, the cam followers 46 are positioned so that they are engaged by cam 36 as it is driven by the rotation of shaft 34, with the reverse air dampers being forced open when the cam follower associated with it is engaged by the cam. The rotary damper and the cam are so positioned on the shaft 34 that when the rotary damper closes one of the inlet openings 29 to thereby discontinue the flow of dust-laden gases into a compartment of the bag housing (such as compartment c in FIGURE 3), the cam is in such a position as to open the reverse air damper for that compartment, thereby permitting a reverse air stream to enter that compartment and clean the filter bags. As the rotary damper rotates past the inlet opening, the reverse air damper is closed, allowing the compartment to resume its normal filtering operation. Thus, the rotary damper and each of the reverse air dampers are responsive to the rotation of shaft 34 driven by motor 35. Dust which is removed from the bags during the cleaning cycle falls to the bottom of the hopper where it is removed through a discharge valve. Door 48 permits access to the bottom of the hopper, and door 49 permits access to a compartment of the housing, there being a door 49 for each compartment of the dust collector.

Figure 10:
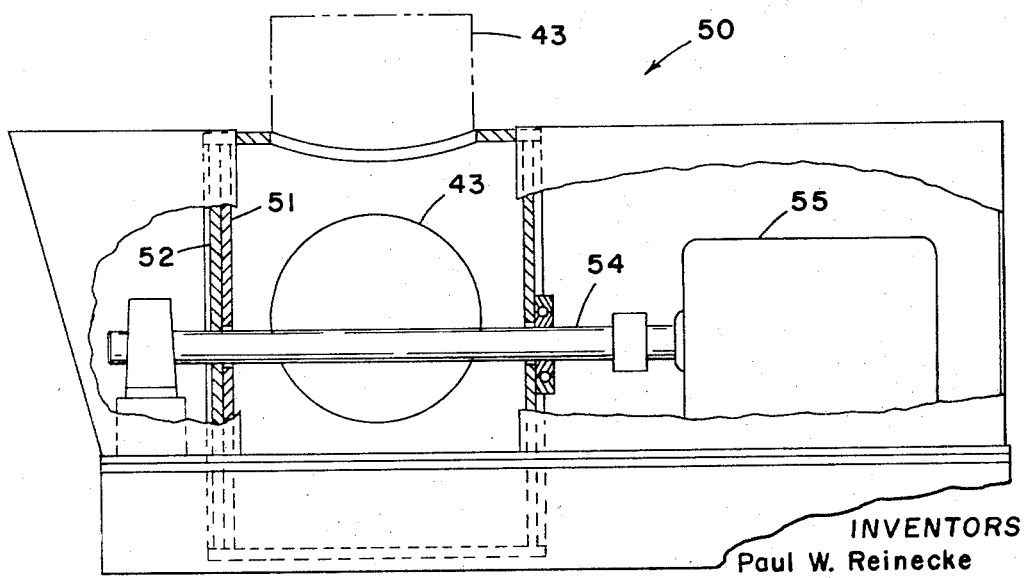
FIGURE 10 is a sectional view of the device used for generating a pulsatory current of reverse cleaning air.

As discussed above, a pulsating stream of air is more effective than a continuous stream in cleaning the bags. According to the present invention, a continuously operating pulsatory air current generator 50 is provided to supply a current of pulsatory air to the bag housing for cleaning of the filter bags. This generator, which is illustrated in FIGURES 10–12, comprises a pair of circular plates 51 and 52, with both plates having a plurality of openings 53 extending through the plates. One plate 51 is fixed in position while the other plate 52 is mounted for rotation on a rotary shaft 54 driven by motor 55, which is continuously operating. Each of the reverse air ducts 43 is connected to this pulsatory air current generator, so that a pulsatory current of air may be supplied to each of the compartments of the bag housing. The pulsatory air flow is obtained when the openings in the pair of plates are in alignment as plate 52 is rotated on the shaft. Preferably the drive speeds of motors 55 (in the pulsatory air current generator) and 35 (for the rotary damper) are adjusted so that air passes through the aligned openings in the pair of plates three times during the cleaning of each compartment.

It will be understood that this invention is capable of further modification, and this application is intended to cover any variations, uses or adaptations of the invention which are within the scope of the appended claims.

We claim:

1. A bag type dust collector comprising a plurality of upper compartments each having a plurality of filter bags suspended therein, a lower compartment below said bags of each upper compartment having openings into the inside of said filter bags, an inlet flue opening into each said lower compartment for introducing dust-laden air into said collector, a discharge duct opening into each said upper compartment for alternately removing filtered air and supplying reverse air, a cylindrical discharge chamber having a plurality of inlet openings uniformly spaced around the circumference thereof, a partial cylindrical arcuate damper of a shape larger than one of said inlet openings mounted on a rotary shaft for rotation coaxially in said discharge chamber whereby rotation thereof closes and opens said inlet openings successively, one of said discharge ducts from respective upper compartments opening into each respective inlet opening in said discharge chamber, a continuously open discharge opening in said discharge chamber for final discharge of dust free gases therefrom and through an exhaust fan, a rotary cam mounted on said rotary shaft externally of said discharge chamber, drive means connected for rotating said rotary shaft, a reverse air duct opening into each said discharge duct adjacent said discharge chamber, a reverse air damper biased closed in said reverse air duct adjacent said discharge duct, a cam follower affixed to each said reverse air damper and disposed to be activated by said rotary cam for opening said reverse air damper when said partial-cylindrical damper closes the inlet opening of the same respective discharge duct, and a pulsatory air current generator connected to said reverse air ducts and adapted to supply a pulsatory air current to said reverse air ducts.

2. A dust collector as defined in claim 1 wherein said upper compartment and said lower compartment are contained within a common housing and said discharge chamber is disposed outside said housing for ready access thereto.

3. A dust collector as defined in claim 1 wherein the inner surface of said discharge chamber is provided with a salient portion surrounding each of said inlet openings, each of said salient portions being provided with a curved surface, and said partial cylindrical damper has the arcuate surface adapted to engage said curved surface of the salient portions as said partial cylindrical damper rotates within said discharge chamber, thereby to close said inlet openings in said chamber.

4. A dust collector as defined in claim 1 wherein each said reverse air damper is mounted for ortation on a damper shaft in a respective reverse air duct and is adapted to close the said reverse air duct in when it is mounted, and each said respective cam follower is affixed on a respective damper shaft outside of the reverse air duct, said cam follower being adapted to be engaged by said rotary cam as the cam rotates around the rotary shaft, thereby to open the reverse air damper associated with said cam follower to permit a current of pulsatory air to flow into the discharge duct communicating with said reverse air duct.

References Cited

UNITED STATES PATENTS

| | | | |
|---|---|---|---|
| 1,509,912 | 9/1924 | Stebbins | 55—303 |
| 1,628,601 | 5/1927 | Fiend | 55—303 |
| 1,784,339 | 12/1930 | Clasen et al. | 55—302 |
| 2,576,656 | 11/1951 | Wallin | 55—283 |
| 3,097,938 | 7/1963 | Weller | 55—302 |
| 3,107,386 | 10/1963 | Mandin | 55—96 |
| 3,209,521 | 10/1965 | Roujob | 55—303 |
| 3,269,096 | 8/1966 | Smith | 55—302 |
| 3,277,633 | 10/1966 | Smoot | 55—302 |
| 3,332,217 | 7/1967 | Rymer | 55—302 |
| 3,332,218 | 7/1967 | O'Dell | 55—303 |

FRANK W. LUTTER, *Primary Examiner.*

BERNARD NOZICK, *Assistant Examiner.*

U.S. Cl. X.R.

55—341